(12) United States Patent
Iwasaki et al.

(10) Patent No.: US 11,124,321 B2
(45) Date of Patent: Sep. 21, 2021

(54) LID CLOSING DEVICE AND LID CLOSING METHOD

(71) Applicants: KAWASAKI JUKOGYO KABUSHIKI KAISHA, Kobe (JP); MEDICAROID CORPORATION, Kobe (JP)

(72) Inventors: Yukio Iwasaki, Kobe (JP); Satoshi Ouchi, Kobe (JP); Eiji Mitsui, Kobe (JP); Junichi Matsuoka, Kobe (JP); Yukihiko Kitano, Kobe (JP)

(73) Assignees: KAWASAKI JUKOGYO KABUSHIKI KAISHA, Hyogo (JP); MEDICAROID CORPORATION, Hyogo (JP)

( * ) Notice: Subject to any disclaimer, the term of this patent is extended or adjusted under 35 U.S.C. 154(b) by 291 days.

(21) Appl. No.: 16/230,256

(22) Filed: Dec. 21, 2018

(65) Prior Publication Data

US 2019/0193878 A1     Jun. 27, 2019

(30) Foreign Application Priority Data

Dec. 26, 2017   (JP) .............................. JP2017-250249

(51) Int. Cl.
*B65B 7/28*     (2006.01)
*B25J 1/00*     (2006.01)
*B25J 15/02*    (2006.01)

(52) U.S. Cl.
CPC .................. *B65B 7/28* (2013.01); *B25J 1/00* (2013.01); *B25J 15/0253* (2013.01)

(58) Field of Classification Search
CPC ....... B65B 7/28; B65B 7/2807; B65B 7/2842; B25J 1/00; B25J 15/0253
USPC ........................................ 53/485; 901/30, 31
See application file for complete search history.

(56) References Cited

U.S. PATENT DOCUMENTS

| | | | | |
|---|---|---|---|---|
| 1,920,539 A | * | 8/1933 | White | B65B 7/28 53/432 |
| 2,054,492 A | * | 9/1936 | Young | B65B 31/025 53/432 |
| 2,931,147 A | * | 4/1960 | Barnby | B65B 31/046 53/432 |
| 3,269,588 A | * | 8/1966 | Ruekberg | B65D 21/022 53/485 |
| 3,289,383 A | * | 12/1966 | Foss | B67C 7/0086 53/432 |
| 3,398,500 A | * | 8/1968 | Inman | B65B 31/028 53/432 |

(Continued)

FOREIGN PATENT DOCUMENTS

| | | |
|---|---|---|
| JP | S60-254209 A | 12/1985 |
| JP | 2003-081214 A | 3/2003 |

(Continued)

*Primary Examiner* — Robert F Long
*Assistant Examiner* — Eduardo R Ferrero
(74) *Attorney, Agent, or Firm* — Oliff PLC

(57) ABSTRACT

The present invention provides a lid closing device and a lid closing method, each of which does not require a high degree of accuracy when performing a lid closing operation. A holding portion moves such that a lid is located at a position above a container. Holding of the lid by the holding portion is released at the position above the container. The lid falls to cover the container. Thus, the lid closing operation is performed.

14 Claims, 6 Drawing Sheets

(56) References Cited

U.S. PATENT DOCUMENTS

| | | | | |
|---|---|---|---|---|
| 3,694,999 A | * | 10/1972 | Switliski | B65B 7/2807 53/313 |
| 3,979,876 A | * | 9/1976 | Moore | B65B 7/2871 53/485 |
| 4,065,909 A | * | 1/1978 | Mueller | B65B 7/168 53/420 |
| 4,098,058 A | * | 7/1978 | Carrigan | B65B 7/28 141/238 |
| 4,170,861 A | * | 10/1979 | Snyder | B65B 43/44 53/468 |
| 4,184,523 A | * | 1/1980 | Carrigan | B65B 3/30 141/238 |
| 4,312,172 A | * | 1/1982 | Fisher | B65B 7/2807 221/14 |
| 4,420,924 A | * | 12/1983 | Hoyrup | B65B 7/2807 53/307 |
| 4,543,702 A | * | 10/1985 | Wada | A45D 40/16 264/242 |
| 4,569,549 A | * | 2/1986 | Nakashima | B25J 15/0266 294/116 |
| 4,570,420 A | * | 2/1986 | Raz | B65B 7/28 53/287 |
| 4,588,349 A | * | 5/1986 | Reuter | B65G 1/1378 414/411 |
| 4,594,838 A | * | 6/1986 | Ficken | B65B 7/28 53/281 |
| 4,601,160 A | * | 7/1986 | Heisler | B65B 7/2842 193/47 |
| 4,632,631 A | * | 12/1986 | Dunlap | B25J 9/1612 294/119.1 |
| 4,691,501 A | * | 9/1987 | King | B65B 7/2842 221/222 |
| 4,771,903 A | * | 9/1988 | Levene | B65B 7/2878 156/69 |
| 4,816,730 A | * | 3/1989 | Wilhelm, Jr. | B25J 9/161 318/568.22 |
| 4,835,943 A | * | 6/1989 | Mueller | B65B 7/2807 53/202 |
| 4,861,087 A | * | 8/1989 | Park | B25J 15/0253 294/119.1 |
| 4,872,803 A | * | 10/1989 | Asakawa | B25J 9/1015 414/730 |
| 4,896,480 A | * | 1/1990 | Blumle | B65B 7/28 53/313 |
| 4,947,622 A | * | 8/1990 | Danforth | B65B 7/28 53/291 |
| 4,949,526 A | * | 8/1990 | Brogna | B65B 7/2807 221/104 |
| 5,076,039 A | * | 12/1991 | Shibauchi | B65B 7/2807 53/478 |
| 5,214,904 A | * | 6/1993 | DePoint | B65B 5/04 53/169 |
| 5,256,128 A | * | 10/1993 | Neumann | B23Q 1/0063 294/86.4 |
| 5,366,896 A | * | 11/1994 | Margrey | G16H 40/63 436/48 |
| 5,628,604 A | * | 5/1997 | Murata | H01L 21/67769 414/283 |
| 5,649,451 A | * | 7/1997 | Ruland | B23Q 1/4828 74/89.3 |
| 5,758,469 A | * | 6/1998 | George | B65B 7/28 53/290 |
| 5,758,476 A | * | 6/1998 | Van Den Akker | B67B 3/06 53/314 |
| 6,141,939 A | * | 11/2000 | Pedrotti | B65B 7/2814 53/314 |
| 6,449,827 B1 | * | 9/2002 | Clarke | B25B 11/005 269/303 |
| 6,558,628 B1 | * | 5/2003 | Reo | B01L 3/50853 215/247 |
| 6,676,363 B1 | * | 1/2004 | Solignac | B25J 5/007 414/541 |
| 6,998,094 B2 | * | 2/2006 | Haslam | G01N 35/028 141/129 |
| 7,536,839 B2 | * | 5/2009 | Kemper | A61L 2/22 53/426 |
| 8,585,111 B2 | * | 11/2013 | Nammoto | B25J 15/10 294/106 |
| 8,703,492 B2 | * | 4/2014 | Self | G01N 35/026 436/47 |
| 8,893,459 B2 | * | 11/2014 | Hecktor | B67B 3/06 53/485 |
| 9,133,002 B1 | * | 9/2015 | Eller | B65B 7/2842 |
| 9,981,382 B1 | * | 5/2018 | Strauss | B25J 9/1666 |
| 2003/0000178 A1 | * | 1/2003 | Connelly | B65B 7/28 53/487 |
| 2003/0170098 A1 | * | 9/2003 | Motley | B65G 1/14 414/416.01 |
| 2004/0004085 A1 | * | 1/2004 | Williams | G07F 11/44 221/278 |
| 2005/0158212 A1 | * | 7/2005 | Yavilevich | G01N 35/0099 422/400 |
| 2006/0137760 A1 | * | 6/2006 | Dubois | B65B 1/32 141/1 |
| 2006/0144017 A1 | * | 7/2006 | Ruppman, Sr. | B67C 3/222 53/432 |
| 2006/0200968 A1 | * | 9/2006 | Thilly | B29C 66/131 29/527.1 |
| 2007/0258858 A1 | * | 11/2007 | Rasnow | G01N 35/0099 422/63 |
| 2007/0282485 A1 | * | 12/2007 | Nagatsuka | B25J 9/1671 700/245 |
| 2007/0284276 A1 | * | 12/2007 | Luttik | B65D 43/0218 206/508 |
| 2008/0251019 A1 | * | 10/2008 | Krishnaswami | H01L 21/67236 118/729 |
| 2009/0223592 A1 | * | 9/2009 | Procyshyn | B65B 7/2807 141/2 |
| 2009/0302626 A1 | * | 12/2009 | Dollar | B25J 9/104 294/106 |
| 2012/0134769 A1 | * | 5/2012 | Friedman | G01N 35/0099 414/751.1 |
| 2013/0161225 A1 | * | 6/2013 | Lepot | B01L 9/54 206/557 |
| 2013/0195584 A1 | * | 8/2013 | Furuichi | B25J 9/1664 414/217 |
| 2014/0174028 A1 | * | 6/2014 | Yamagata | B65B 7/28 53/287 |
| 2014/0196411 A1 | * | 7/2014 | Procyshyn | B25J 21/02 53/467 |
| 2014/0331618 A1 | * | 11/2014 | Guggisberg | B65B 7/2807 53/485 |
| 2015/0143781 A1 | * | 5/2015 | Agnihotri | A61L 2/26 53/467 |
| 2015/0166217 A1 | * | 6/2015 | Deutschle | B65B 7/2842 53/425 |
| 2015/0224507 A1 | * | 8/2015 | Menges | G01N 35/04 435/29 |
| 2016/0229565 A1 | * | 8/2016 | Margner | G01N 35/04 |
| 2016/0304252 A1 | * | 10/2016 | Shinozaki | B65D 43/065 |
| 2016/0376604 A1 | * | 12/2016 | McCarty, II | C12N 15/8205 800/294 |
| 2017/0030940 A1 | * | 2/2017 | Nakamura | B25J 9/1633 |
| 2017/0121046 A1 | * | 5/2017 | Diaz | B65B 55/027 |
| 2019/0023503 A1 | * | 1/2019 | Tanoue | B65G 59/063 |
| 2019/0100339 A1 | * | 4/2019 | Tanoue | B65B 7/2842 |
| 2019/0177013 A1 | * | 6/2019 | Bertolin | B65B 43/42 |

FOREIGN PATENT DOCUMENTS

| | | |
|---|---|---|
| JP | 2009-291103 A | 12/2009 |
| JP | 2014-119328 A | 6/2014 |

* cited by examiner

LID CLOSING DEVICE AND LID CLOSING METHOD

BACKGROUND OF THE INVENTION

1. Field of the Invention

The present invention relates to a lid closing device and a lid closing method, each of which performs a lid closing operation with respect to a container storing a specimen.

2. Description of the Related Art

A device configured to perform a lid closing operation with respect to a container storing a specimen by using a robot has been proposed. One example of such device configured to perform the lid closing operation with respect to the container storing the specimen is disclosed in Japanese Laid-Open Patent Application Publication No. 2009-291103.

Japanese Laid-Open Patent Application Publication No. 2009-291103 discloses a technique of performing the lid closing operation in which an arm holds a lid and performs a circular motion to cover a container storing a specimen with the lid.

However, according to the device disclosed in Japanese Laid-Open Patent Application Publication No. 2009-291103, the lid held by the arm needs to be accurately arranged at a predetermined position on the container storing the specimen. Therefore, a position where the arm holds the lid and a position where the container is provided require a high degree of accuracy. Further, the movement of the arm requires a high degree of accuracy. Therefore, the shape of a holding portion of the arm which portion holds the lid requires a high degree of accuracy, and the shape of the position where the container is provided requires a high degree of accuracy. In addition, the movement of the arm when controlling the arm requires a high degree of accuracy. Therefore, the manufacturing cost of the lid closing device may increase.

SUMMARY OF THE INVENTION

An object of the present invention is to provide a lid closing device and a lid closing method, each of which does not require a high degree of accuracy when performing a lid closing operation.

A lid closing device according to one aspect of the present invention includes: a holding portion configured to hold a lid; and a control portion configured to control movement of the holding portion and holding of the lid by the holding portion, wherein the control portion performs a lid closing operation in which: the holding portion moves such that the lid is located at a position above a container; the holding of the lid by the holding portion is released at the position above the container; and the lid falls to cover the container.

According to the lid closing device configured as above, the lid falls to cover the container, and thus, the lid closing operation is performed. Therefore, the lid closing device does not require a high degree of accuracy, and the manufacturing cost of the lid closing device can be made low.

The lid closing device may be configured such that: in a state where the lid is tilted, the control portion moves the holding portion to bring a first end portion of the lid into contact with a first end portion of an edge portion of the container; and in a state where the first end portion of the lid and the first end portion of the edge portion contact each other, the control portion releases the holding of the lid by the holding portion.

The lid is tilted, and the first end portion of the lid is brought into contact with the first end portion of the edge portion of the container. In this state, the lid falls to cover the opening portion of the container. Thus, the lid closing operation with respect to the container is performed. Therefore, positioning between the lid and the container can be performed in the lid closing operation, and the lid closing operation can be accurately performed.

The lid closing device may further include a container installation portion at which the container is provided.

Since the container installation portion is included, a position where the container is provided can be recognized, and therefore, the lid closing operation can be accurately performed.

The holding portion may be constituted by a robot arm.

Since the holding portion is constituted by the robot arm, the holding portion can accurately move, and therefore, the lid closing operation can be accurately performed.

A lid closing method according to one aspect of the present invention is a lid closing method of performing a lid closing operation of covering an opening portion of a container with a lid, the lid closing method including: holding the lid by a holding portion; moving the holding portion such that the lid is located at a position above the container; and performing the lid closing operation of releasing the holding of the lid by the holding portion, making the lid fall, and covering the container with the lid.

According to the above lid closing method, the lid falls to cover the opening portion of the container, and thus, the lid closing operation with respect to the container is performed. Therefore, the holding portion is not required to accurately move, and therefore, the lid closing operation can be smoothly performed.

DESCRIPTION OF THE PREFERRED EMBODIMENTS

Hereinafter, a lid closing device and a lid closing method according to embodiments of the present invention will be explained with reference to the drawings.

Embodiment 1

Figure 1:
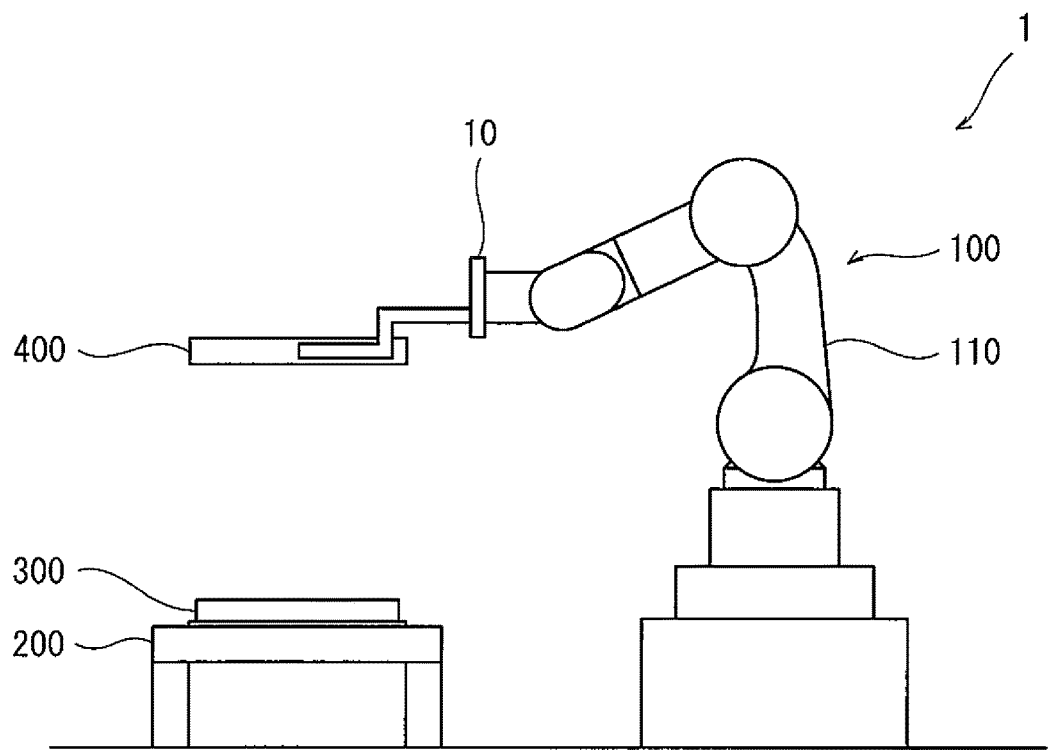
FIG. 1 is a side view of a lid closing device according to Embodiment 1.

FIG. 1 is a side view of a lid closing device 1 according to Embodiment 1 of the present invention.

The lid closing device 1 includes a main body portion 100 and a container installation base (container installation portion) 200. A container 300 is provided on the container installation base 200. The main body portion 100 holds a lid 400 by which a lid closing operation can be performed with respect to the container 300. In the present embodiment, the main body portion 100 is used as a multiaxial industrial robot. The main body portion 100 used in the present embodiment includes a robot arm 110.

Figure 2:
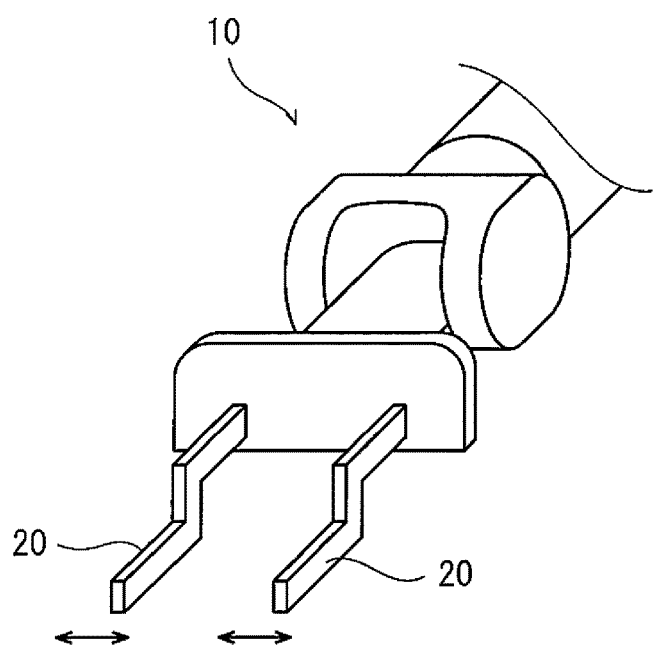
FIG. 2 is a perspective view showing a hand portion of a main body portion of the lid closing device of FIG. 1.

FIG. 2 shows a perspective view of a holding portion 10 of the main body portion 100. In the present embodiment, the holding portion 10 includes two finger portions 20. The two finger portions 20 are configured to be movable so as to approach each other and separate from each other.

When the lid 400 is located between the finger portions 20, and the finger portions 20 move so as to approach each other, the finger portions 20 can sandwich the lid 400 to hold the lid 400.

Although the present embodiment explains a case where the holding portion 10 sandwiches the lid 400 by the finger portions 20 to hold the lid 400, the present invention is not limited to this. The holding portion 10 may have a different configuration. For example, the holding portion 10 may include an adsorbing portion and hold the lid 400 by adsorption.

Figure 3:
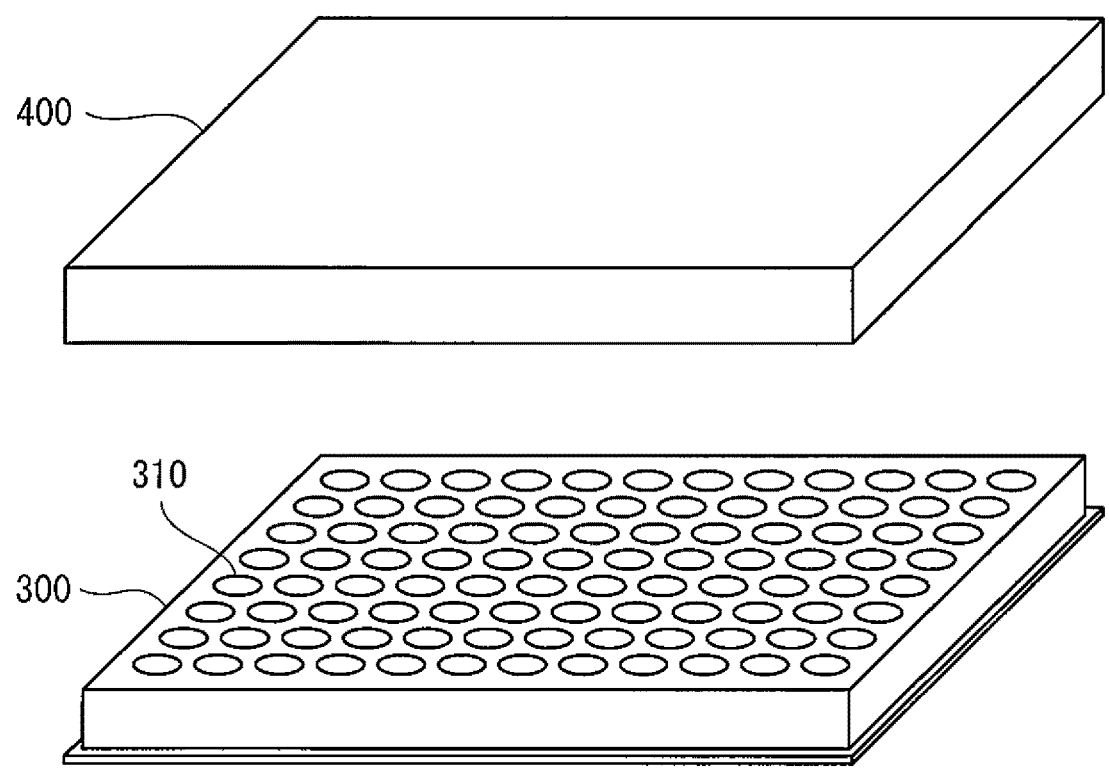
FIG. 3 is a perspective view showing a container and a lid which are subjected to a lid closing operation performed by the lid closing device of FIG. 1.

FIG. 3 shows a perspective view of the container 300 and the lid 400. In the present embodiment, the container 300 is used as a microplate mainly in biochemical analysis, clinical examinations, and the like. The container 300 is made of transparent resin, such as polyethylene or polypropylene. The container 300 includes a plurality of wells 310 that are holes capable of storing liquid. In the present embodiment, twelve wells 310 are lined up along a long side of the container 300, and eight wells 310 are lined up along a short side of the container 300. Therefore, 96 wells 310 are formed in total.

The lid 400 is configured to be able to cover a surface of the container 300 on which surface the wells 310 are formed. An opening portion formed so as to be surrounded by a side surface of the lid 400 is larger than the surface of the container 300 on which surface the wells 310 are formed. Therefore, when the lid 400 covers the container 300, the side surface of the lid 400 is located outside a side surface of the container 300, and an upper portion of the container 300 is accommodated in the opening portion of the lid 400. In order to easily accommodate the upper portion of the container 300, it is preferable that the side surface of the lid 400 be formed so as to widen toward the container 300.

As above, the lid 400 can cover the container 300. Therefore, when liquid, such as a reagent, poured into the wells 310 of the container 300 needs to be preserved for a long period of time, the lid 400 can close opening portions of the wells 310. With this, the liquid in the wells 310 is prevented from being exposed to an outside, and therefore, can be prevented from evaporating.

Figure 4:
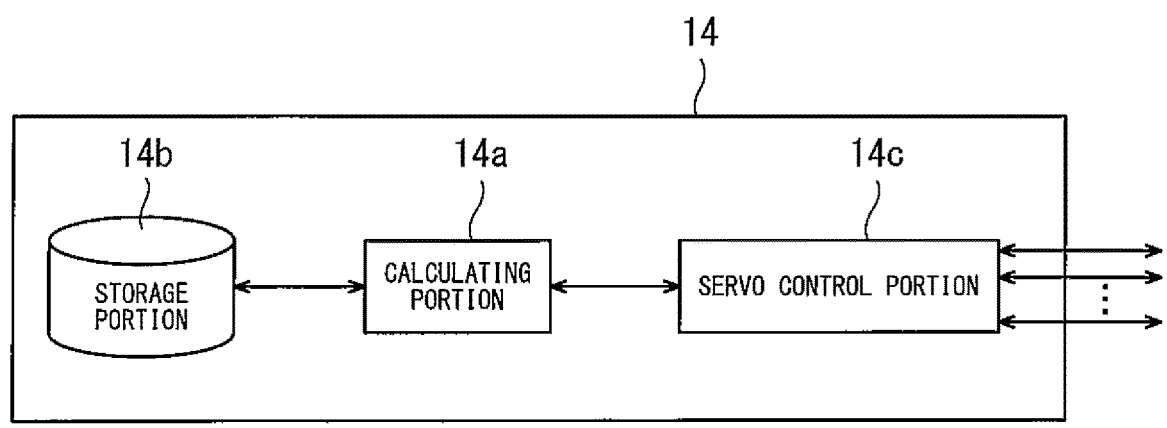
FIG. 4 is a block diagram showing the configuration of a control system of the main body portion of the lid closing device of FIG. 1.

Next, a control configuration of the main body portion 100 will be explained. FIG. 4 shows a block diagram of the control configuration of the main body portion 100.

As shown in FIG. 4, a control portion 14 of the main body portion 100 includes a calculating portion 14a, a storage portion 14b, and a servo control portion 14c.

The control portion 14 is a robot controller including a computer, such as a microcontroller. It should be noted that the control portion 14 may be constituted by a single control portion 14 which performs centralized control or by a plurality of control portions 14 which cooperate to perform distributed control.

The storage portion 14b stores a basic program of the robot controller and information, such as various fixed data. The calculating portion 14a controls various operations of the main body portion 100 by reading and executing software, such as the basic program, stored in the storage portion 14b. To be specific, the calculating portion 14a generates a control command of the main body portion 100 and outputs the control command to the servo control portion 14c. For example, the calculating portion 14a is constituted by a processor unit.

Based on the control command generated by the calculating portion 14a, the servo control portion 14c controls driving of servo motors corresponding to respective joints of the robot arm 110 of the main body portion 100.

Next, the lid closing operation performed by the lid closing device 1 according to the present embodiment will be explained.

FIGS. 5A to 5D are configuration diagrams showing respective steps when the main body portion 100 of the lid closing device 1 performs the lid closing operation by using the lid 400. FIG. 6 shows a flow chart showing steps when the lid closing device 1 performs the lid closing operation.

First, the main body portion 100 of the lid closing device 1 holds the lid 400 (Step S1). In the present embodiment, when the main body portion 100 holds the lid 400, the two finger portions 20 of the holding portion 10 sandwich the lid 400 to hold the lid 400 (holding step). In a state where the lid 400 is located between the finger portions 20, the finger portions 20 are driven so as to approach each other. Thus, the lid 400 is held by the finger portions 20.

Figure 5A:
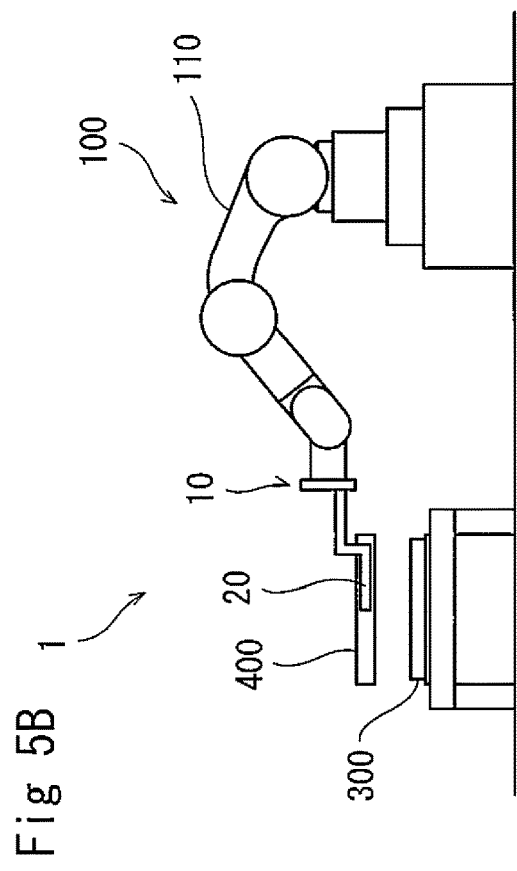
FIGS. 5A to 5D are configuration diagrams showing the lid closing device, the container, and their vicinities in respective steps when performing the lid closing operation by the lid closing device of FIG. 1.
Figure 6:
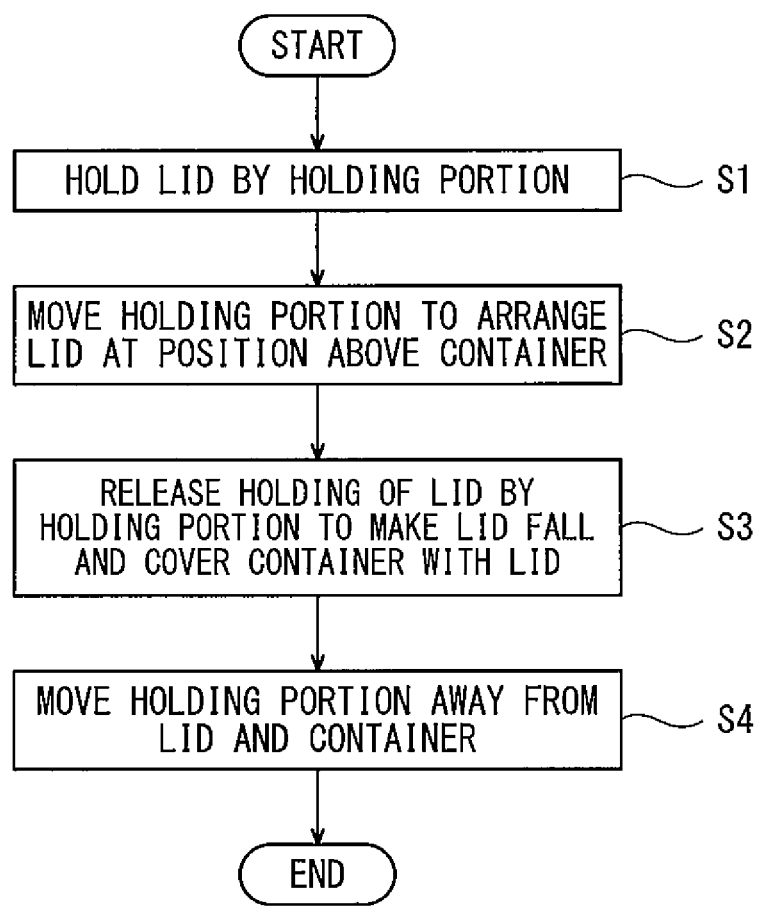
FIG. 6 is a flow chart showing steps of the lid closing operation performed by the lid closing device of FIG. 1.

When the holding portion 10 of the main body portion 100 holds the lid 400, as shown in FIG. 5A, the driving of the robot arm 110 of the main body portion 100 is controlled, and with this, the holding portion 10 moves so as to approach the container 300. By this movement of the holding portion 10, the lid 400 is arranged at a position above the container 300 (Step S2; moving step).

At this time, the container 300 is provided at the container installation base 200. Therefore, by providing the container 300 at a predetermined position of the container installation base 200 of the lid closing device 1, the position where the container 300 is provided is recognized by the lid closing device 1. Since the position where the container 300 is provided is recognized, the lid 400 can be accurately arranged at the position above the container 300, and therefore, the lid closing operation can be accurately performed.

Figure 5B:
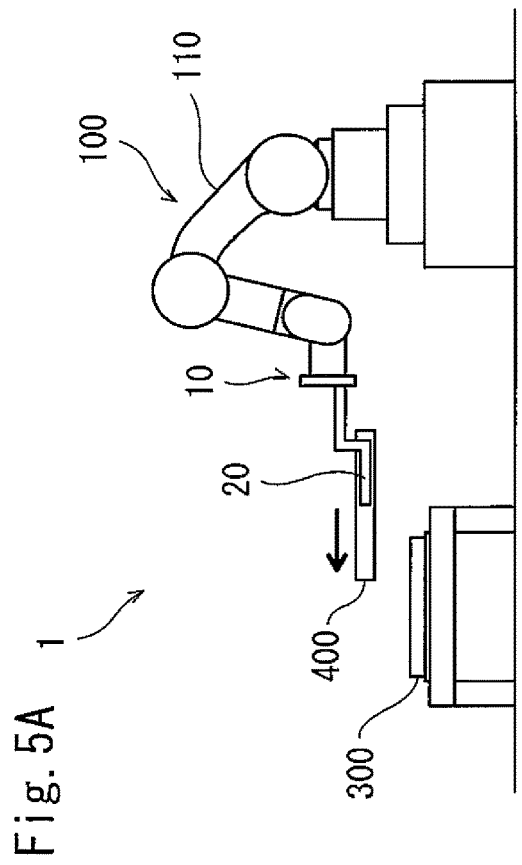

As shown in FIG. 5B, when the lid 400 reaches the position above the container 300, the holding of the lid 400 by the holding portion 10 is released thereat. When releasing the holding of the lid 400 by the holding portion 10, the finger portions 20 move away from each other.

Figure 5C:
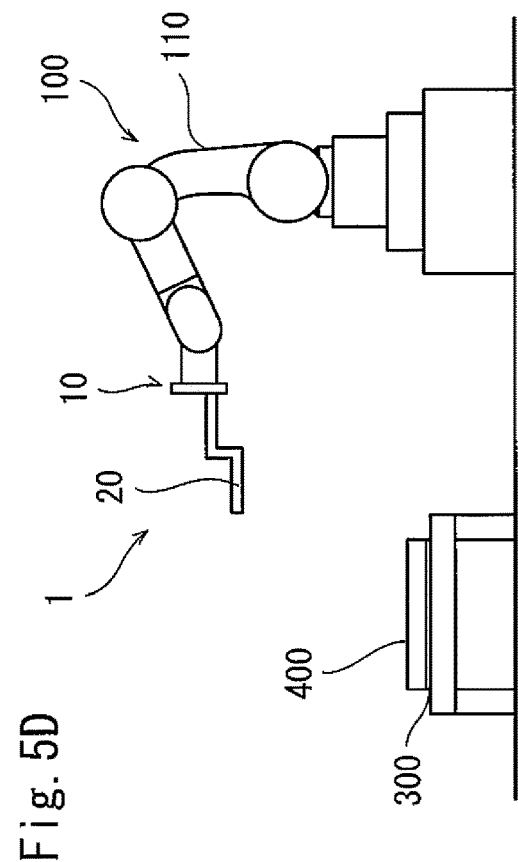

When the holding of the lid 400 by the holding portion 10 is released, as shown in FIG. 5C, the lid 400 falls from the position where the lid 400 is held by the holding portion 10. At this time, since the lid 400 is located above the container 300, the lid 400 falls to cover the container 300 (Step S3; lid closing step). When the lid 400 covers the container 300, the lid closing operation performed by the lid closing device 1 with respect to the container 300 by using the lid 400 is completed.

Figure 5D:
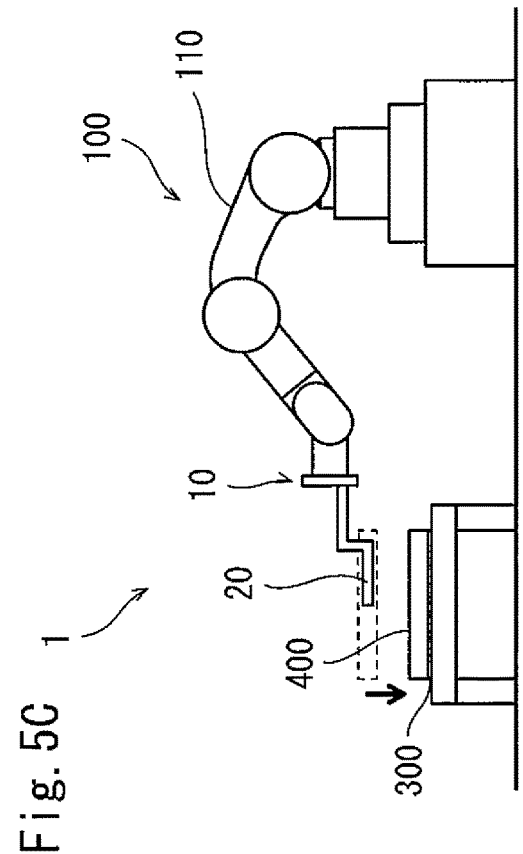

When the lid closing operation performed by the lid closing device 1 with respect to the container 300 by using the lid 400 is completed, the driving of the robot arm 110 of the main body portion 100 is controlled, and as shown in FIG. 5D, the holding portion 10 moves away from the lid 400 and the container 300 (Step S4).

Figure 7A:
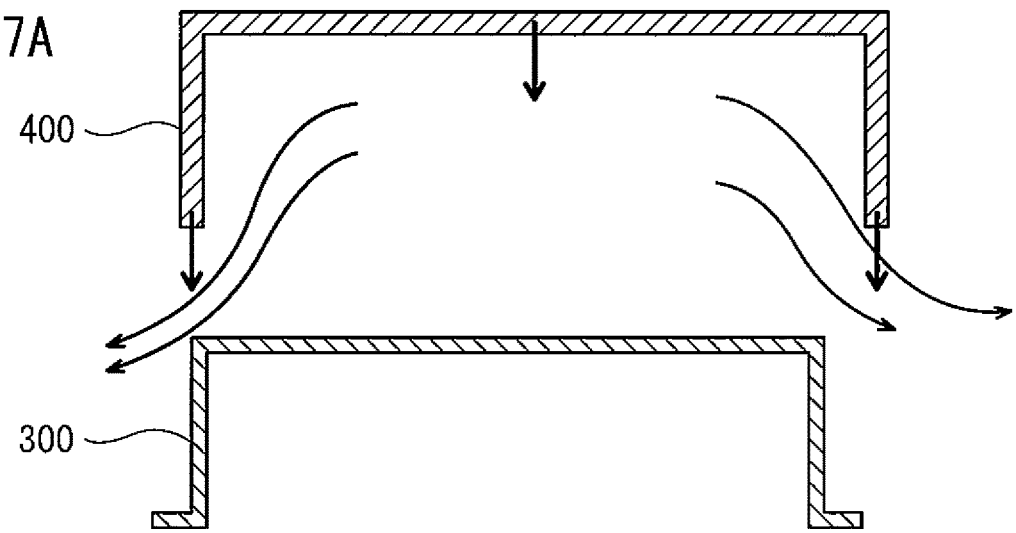
FIGS. 7A to 7C are configuration diagrams schematically showing the flow of air around the lid when performing the lid closing operation by the lid closing device of FIG. 1 in a state where the lid is displaced relative to the container.
Figure 7B:
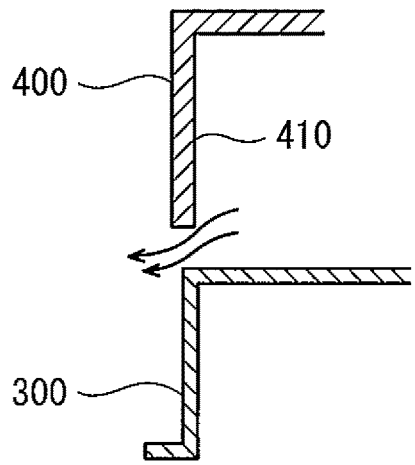
Figure 7C:
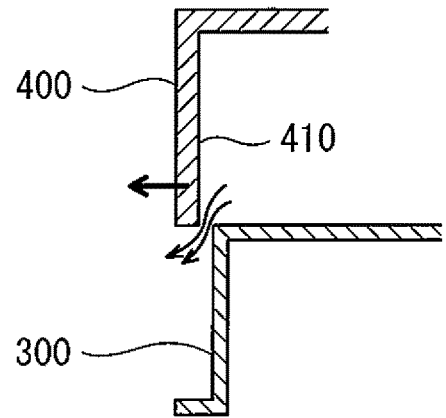

FIGS. 7A to 7C show the flow of air around the lid 400 when the lid 400 falls to cover the container 300 in a state where the lid 400 is displaced relative to the container 300.

As shown in FIG. 7A, when the lid 400 falls, the lid 400 moves downward by gravity. Therefore, the air in the lid 400 is pushed by the lid 400 to flow to an outside of the lid 400. Thus, the flow of the air from the inside of the lid 400 to the outside of the lid 400 is generated.

Since the lid 400 is falling, the lid 400 is approaching the container 300 while the air is flowing in a direction from the inside of the lid 400 to the outside of the lid 400. At this time, as shown in FIG. 7B, if the position of the lid 400 is inappropriate, and the lid 400 is likely to contact the container 300, a side wall 410 of the lid 400 is pushed outward by the air flow generated in a region between the lid 400 and the container 300. Since the side wall 410 of the lid 400 is pushed by the air flow, as shown in FIG. 7C, the side wall 410 of the lid 400 moves toward an outside of the container 300. Thus, the inappropriate position of the lid 400 is corrected.

As above, when a positional error between the lid 400 and the container 300 is relatively small, such positional error can be corrected by releasing the holding of the lid 400, making the lid 400 fall, and covering the container 300 with the lid 400. Therefore, when performing the lid closing operation with respect to the container 300 by using the lid 400, it is unnecessary to increase positional accuracy between the lid 400 and the container 300. On this account, the position where the holding portion 10 holds the lid 400 and the position where the container 300 is arranged do not require high positional accuracy. Thus, the lid closing device 1 does not require a high degree of accuracy, and the manufacturing cost of the lid closing device 1 can be made low.

The accuracy of the lid closing operation with respect to the container 300 by using the lid 400 can be kept high. If the positional error between the container 300 and the lid 400 is not corrected in the lid closing operation, there is a possibility that the lid 400 does not completely cover the container 300, and the lid 400 and the container 300 are conveyed to the next step with the lid 400 placed on the surface of the container 300 on which surface the wells 310 are formed. For example, when the lid 400 and the container 300 are accommodated in a rack after the lid 400 covers the container 300, there is a possibility that the rack contacts the lid 400 or the container 300.

Further, according to the present invention, when performing the lid closing operation by the lid closing device 1, the positional error between the lid 400 and the container 300 is corrected. Therefore, it is unnecessary to increase the positional accuracy of the holding portion 10. On this account, in the driving control of the robot arm 110 of the main body portion 100, it is unnecessary to increase the accuracy of the movement of the robot arm 110. Thus, the servo motors configured to drive the robot arm 110 of the main body portion 100 do not require high positional accuracy, and therefore, the manufacturing cost of the main body portion 100 can be further made low. Therefore, the manufacturing cost of the lid closing device 1 can be further made low.

Further, as described above, the positional error between the lid 400 and the container 300 is corrected. Therefore, even when the positional error between the lid 400 and the container 300 occurs during the lid closing operation, the lid closing operation can be smoothly performed. On this account, even if the accuracy of the lid closing device 1 is low, the lid closing operation can be smoothly and surely performed.

When the lid closing operation is performed by covering the container with the lid, as in conventional cases, the lid may be held until the lid covers the container. However, in this case, when the lid covers the container, the holding portion holding the lid needs to be accurately arranged at a position where the lid covers the container. Therefore, the positional accuracy between the lid and the container is required to be high. Further, the positional accuracy of the servo motors configured to drive the robot arm is required to be high, and therefore, the manufacturing cost of the lid closing device may increase. Further, in a case where a movement speed of the lid is increased when covering the container with the lid, the lid may be pushed by air between the lid and the container, and this may cause the positional error between the lid and the container. Thus, the lid may not cover the container with a high degree of accuracy. Furthermore, in a case where the movement speed of the lid is decreased in order to eliminate the influence of the air when covering the container with the lid, the lid closing operation takes much time, and the efficiency of the lid closing operation by the lid closing device may deteriorate.

On the other hand, according to the present embodiment, when the lid 400 reaches a position above the container 300, the holding of the lid 400 by the holding portion 10 is released, and the lid 400 falls by gravity to cover the container 300. Thus, the lid closing operation can be performed relatively quickly. Therefore, while keeping the high efficiency of the lid closing operation performed by the lid closing device 1, the lid 400 can accurately cover the container 300. On this account, the operating cost of the lid closing device 1 can be made low.

The above embodiment has explained a case where the container 300 is used as a microplate mainly in biochemical analysis, clinical examinations, and the like. However, the present invention is not limited to the above embodiment and may be applied to a case where the lid closing operation is performed with respect to a container used for the other purposes.

Further, the above embodiment has explained a case where each of the lid 400 and the container 300 has a rectangular parallelepiped shape. However, the present invention is not limited to the above embodiment, and for example, each of the lid 400 and the container 300 may be cylindrical. As long as the lid 400 can cover the container 300, each of the lid 400 and the container 300 may have the other shape.

Embodiment 2

Next, the lid closing device according to Embodiment 2 of the present invention will be explained. In Embodiment 2, explanations of the same components as Embodiment 1 are omitted, and only the different components from Embodiment 1 will be explained.

In Embodiment 1, the holding portion 10 holds the lid 400. Then, the holding portion 10 moves until the lid 400 reaches a position above the container 300. In a state where the lid 400 and the container 300 are separated from each other, the holding portion 10 releases the holding of the lid 400. On the other hand, in Embodiment 2, the holding portion 10 is tilted at a position above the container 300, and therefore, the lid 400 is tilted. In a state where a part of the lid 400 and a part of the container 300 contact each other, the holding portion 10 releases the holding of the lid 400. Embodiment 2 is different from Embodiment 1 on this point.

FIGS. 8A to 8D are configuration diagrams showing a lid closing device 1a according to Embodiment 2, the container 300, and their vicinities in respective steps when performing the lid closing operation by the lid closing device 1a.

Figure 8A:
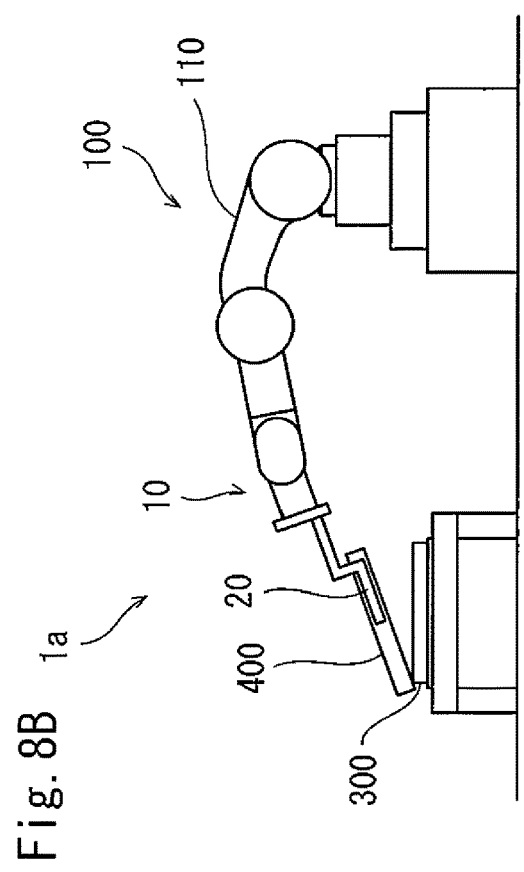
FIGS. 8A to 8D are configuration diagrams showing the lid closing device according to Embodiment 2, the container, and their vicinities in respective steps when performing the lid closing operation by the lid closing device.

As shown in FIG. 8A, the holding portion 10 holds the lid 400 and moves toward the container 300 to move the lid 400 close to the container 300.

When the lid 400 moves by the movement of the holding portion 10 and reaches a position above the container 300, the holding portion 10 is tilted, and therefore, the lid 400 is tilted. By the tilt of the lid 400, only a first end portion of the lid 400 is located close to a first end portion of the container 300. Then, in a state where the holding portion 10 holds the lid 400, the holding portion 10 moves downward until the first end portion of the lid 400 contacts the first end portion of the container 300. Thus, the lid 400 moves toward the container 300.

Figure 8B:
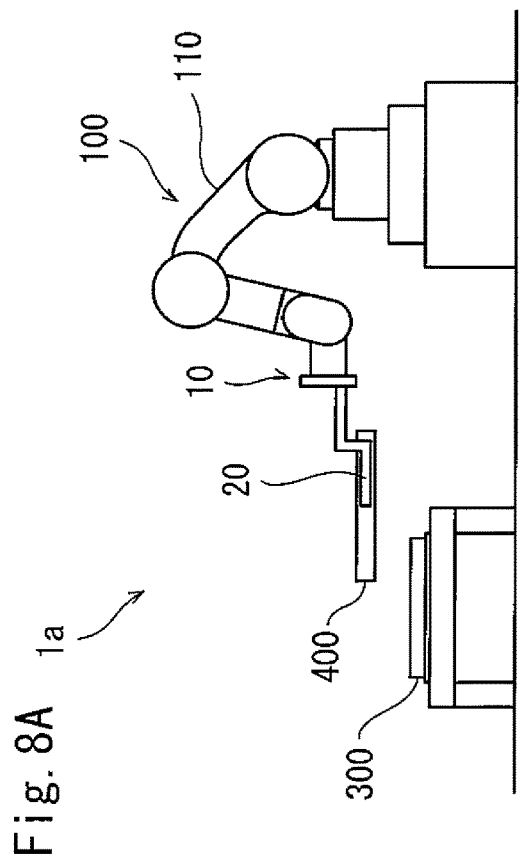
Figure 8C:
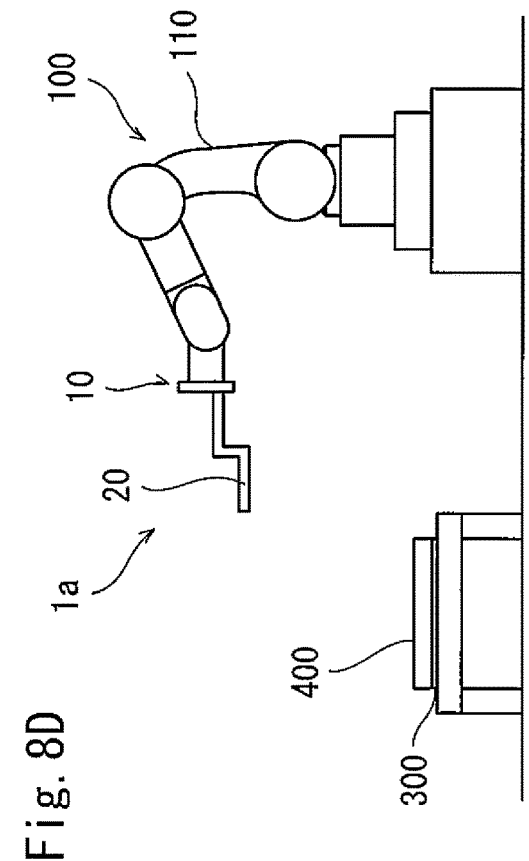

After the lid 400 moves downward in a tilted state, as shown in FIG. 8B, the first end portion of the lid 400 contacts the first end portion of the container 300. When the first end portion of the lid 400 and the first end portion of the container 300 contact each other, the holding of the lid 400 by the holding portion 10 is released. With this, a second end portion of the lid 400 which portion has been held by the holding portion 10 falls by gravity, and the second end portion of the lid 400 covers a second end portion of the container 300. Thus, as shown in FIG. 8C, the lid 400 entirely covers the container 300. When the lid 400 covers the container 300, the lid closing operation performed by the lid closing device 1a with respect to the container 300 by using the lid 400 is completed.

Figure 8D:
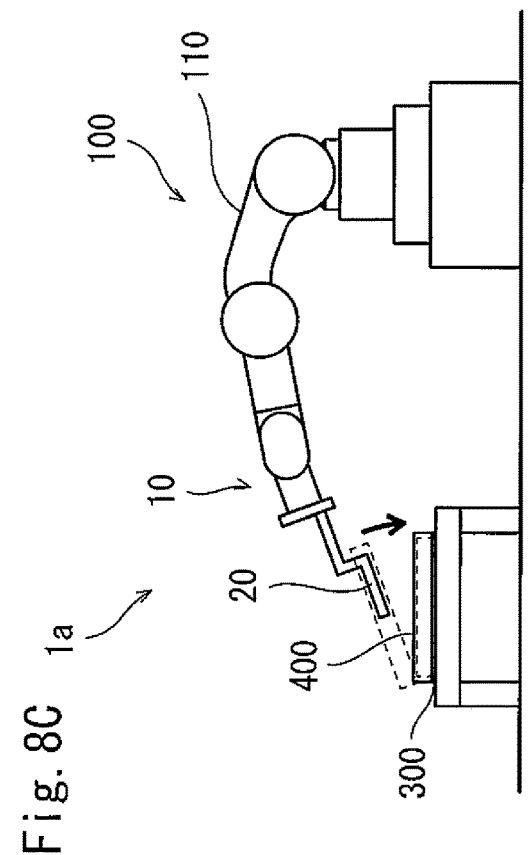

When the lid closing operation performed by the lid closing device 1a with respect to the container 300 by using the lid 400 is completed, as shown in FIG. 8D, the holding portion 10 moves away from the lid 400 and the container 300.

As above, in Embodiment 2, the lid 400 is tilted by tilting the holding portion 10, and the lid 400 moves toward the container 300 until the first end portion of the lid 400 and the first end portion of the container 300 contact each other. When the lid 400 and the container 300 contact each other, the holding of the lid 400 by the holding portion 10 is released, and the lid 400 moves downward by gravity to cover the container 300.

As above, in a state where the first end portion of the lid 400 and the first end portion of the container 300 contact each other, the lid 400 falls by gravity to cover the container 300. Therefore, positioning between the lid 400 and the container 300 can be performed in the lid closing operation. Thus, the lid closing operation can be more accurately performed.

Further, as above, in a state where the first end portion of the lid 400 and the first end portion of the container 300 contact each other, the lid 400 falls by gravity to cover the container 300. Therefore, for example, when the opening portion formed by the side wall of the lid 400 is rectangular, and an edge portion of the container 300 is rectangular, a parallel relation between the lid 400 and the container 300 is corrected, and the lid 400 covers the container 300 in this state. Since the lid closing operation with respect to the container 300 by using the lid 400 is performed in a state where the parallel relation between the lid 400 and the container 300 is corrected, the lid closing operation can be more accurately performed.

What is claimed is:

1. A lid closing device comprising:
   a holding portion comprising a robot arm including a plurality of joints, and first and second finger portions provided at a distal end of the robot arm, wherein the first and second finger portions are configured to be movable so as to approach and separate from each other; and
   a control portion configured to control the holding portion, wherein
   the control portion performs a lid closing operation comprising:
      controlling the robot arm to move the first and second finger portions to a first position for holding a lid;
      controlling the first and second finger portions to hold the lid;
      controlling the robot arm to move the first and second finger portions from the first position to a second position such that the lid held by the first and second finger portions is located at the second position above a container and parallel to an edge portion of the container;
      controlling the first and second finger portions to tilt the held lid by bringing a first end portion of the lid around an axis parallel to the edge portion of the container into contact with a first end portion of the edge portion of the container; and
      controlling the first and second finger portions to release the lid in a state where the first end portion of the lid and the first end portion of the edge portion contact each other.

2. The lid closing device according to claim 1, further comprising a container installation portion at which the container is provided.

3. The lid closing device according to claim 1, wherein the lid closing operation further comprises:
   controlling the robot arm to move the first and second finger portions from the second position to a third position different from the second position.

4. The lid closing device according to claim 1, wherein the robot arm includes a plurality of servo motors, and the respective servo motors are provided so as to correspond to the respective joints.

5. The lid closing device according to claim 4, wherein the control portion controls driving of the servo motors corresponding to the respective joints of the robot arm.

6. The lid closing device according to claim 1, wherein the container includes a microplate having a plurality of wells and the lid has a larger size than the microplate to cover the microplate.

7. The lid closing device according to claim 6, wherein the microplate has 96 wells.

8. A lid closing method of performing a lid closing operation of covering an opening portion of a container with a lid by a lid closing device which comprises a robot arm including a plurality of joints, and first and second finger portions provided at a distal end of the robot arm, wherein the first and second finger portions are configured to be movable so as to approach and separate from each other, the lid closing method comprising:
(a) moving the first and second finger portions by the robot arm to a first position for holding the lid;
(b) holding the lid with the first and second finger portions;
(c) moving the first and second finger portions from the first position to a second position by the robot arm such that the lid held by the first and second finger portions is located at the second position above the container and parallel to an edge portion of the container;
(d) moving the first and second finger portions to tilt the held lid around an axis parallel to the edge portion of the container by bringing a first end portion of the lid into contact with a first end portion of the edge portion of the container; and
(e) releasing the lid by the first and second finger portions in a state where the first end portion of the lid and the first end portion of the edge portion contact each other.

9. The lid closing method according to claim 8, wherein the container is provided at a container installation portion.

10. The lid closing method according to claim 8, further comprises:
moving the first and second finger portions from the second position to a third position different from the second position by the robot arm.

11. The lid closing method according to claim 8, wherein the robot arm includes a plurality of servo motors, and the respective servo motors are provided corresponding to the respective joints.

12. The lid closing method according to claim 11, wherein the control portion controls driving of the servo motors corresponding to the respective joints of the robot arm.

13. The lid closing method according to claim 8, wherein the container includes a microplate having a plurality of wells and the lid has a larger size than the microplate to cover the microplate.

14. The lid closing method according to claim 13, wherein the microplate has 96 wells.

* * * * *